United States Patent [19]

Cholet

[11] 4,130,078
[45] Dec. 19, 1978

[54] FLOATING DEVICE CONNECTED TO A SHIP, FOR TOWING A SUBMERGED MEMBER WITH A LATERAL SHIFT THEREOF WITH RESPECT TO THE SHIP ROUTE

[75] Inventor: Jacques Cholet, Massy, France

[73] Assignee: Institut Francais du Petrole, France

[21] Appl. No.: 831,989

[22] Filed: Sep. 9, 1977

Related U.S. Application Data

[63] Continuation of Ser. No. 646,846, Jan. 5, 1976, abandoned.

[30] Foreign Application Priority Data

Jan. 6, 1975 [FR] France .................................. 75 00384

[51] Int. Cl.² ............................................ B63B 21/56
[52] U.S. Cl. ..................................... 114/244; 114/61; 340/3 T
[58] Field of Search ................. 114/61, 123, 163, 242, 114/244, 245, 246, 253, 271, 274, 281, 283, 284, 292; 340/3 T, 7 R, 7 PC; 115/34 R; 9/310 B, 310 C

[56] References Cited

U.S. PATENT DOCUMENTS

| | | | |
|---|---|---|---|
| 1,269,397 | 6/1918 | Curtiss | 114/292 |
| 1,529,036 | 3/1925 | Richey | 114/163 |
| 2,652,550 | 9/1953 | Lash | 114/245 |
| 3,005,438 | 10/1961 | Muldowney | 114/253 |
| 3,296,992 | 1/1967 | Lackenby | 114/61 |
| 3,613,629 | 10/1971 | Rhyne et al. | 114/245 |
| 3,718,207 | 2/1973 | Babb | 340/7 R |
| 3,760,761 | 9/1973 | Umazume | 114/244 |
| 3,817,202 | 6/1974 | Holtermann | 115/34 R |

*Primary Examiner*—Trygve M. Blix
*Assistant Examiner*—Charles E. Frankfort
*Attorney, Agent, or Firm*—Craig & Antonelli

[57] ABSTRACT

Device for towing a submerged member from a ship, along a direction parallel to the ship route, and laterally shifted with respect thereto, comprising a submerged deflector, including a series of parallel paddles inclined with respect to the longitudinal axis of the device and whose generatrices are perpendicular to the plane of flotation, the deflector being solid with a floating element on the water surface.

6 Claims, 8 Drawing Figures

FLOATING DEVICE CONNECTED TO A SHIP, FOR TOWING A SUBMERGED MEMBER WITH A LATERAL SHIFT THEREOF WITH RESPECT TO THE SHIP ROUTE

This is a Continuation of application Ser. No. 646,846, filed Jan. 5, 1976, now abandoned.

BACKGROUND AND SUMMARY OF THE INVENTION

This invention relates to a floating device connected to a ship, for towing a submerged member with a lateral shift thereof with respect to the ship route.

This device can be used for example in seismic prospecting at sea when it is desired to draw several transmitting sources associated to a receiver, or a transmitting source associated to several receivers, or several transmitting sources associated to several receivers, behind a ship, along parallel directions sufficiently spaced apart from one another. In this case, each source is drawn by a device according to the invention, each device being connected to the ship.

The device of the invention essentially comprises at least two parallel deflectors secured to a floating member. Both of these deflectors consist for example of a series of parallel paddles so oriented as to extend transversely with respect to the longitudinal axis of the device and secured on a common support member at front and rear ends thereof. The floating member may consist of a floating platform at the ends of which are secured parallel deflectors. It may also consist of several floating pipes rigidly connected to one another.

Such a device, connected, on the one hand, to a ship, and, on the other hand, to a submerged member, produces a lateral shift of the latter while forming an assembly of high route stability and maintaining said member at a constant distance from the towing ship, irrespective of the speed variations thereof. It also enables to maintain the submerged member at a known depth and to avoid its laying down on the bottom when the ship stops.

Three embodiments of the device will be described with more details with reference to the accompanying drawings wherein:

DETAILED DESCRIPTION OF THE PREFERRED EMBODIMENTS

Figure 1:
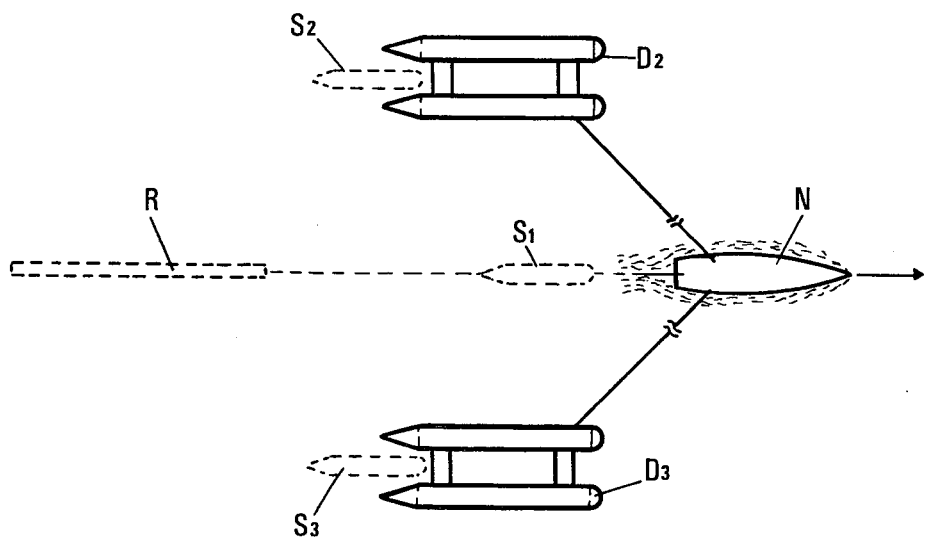
FIG. 1 diagrammatically shows a top view of an assembly of floating devices and submerged members, towed from a ship.

FIG. 1 illustrates a particular method of geophysical prospection making use of several sources transmitting seismic waves, associated to a receiver. For example, a ship N draws, substantially along its longitudinal axis, a first source S1, and a receiver R. For a good operation of the method, other sources must be placed at a selected distance from the first source. These sources S2 and S3 are accordingly each connected to a floating device, respectively D2, D3, which laterally shifts the source with respect to the route of the ship N and imparts thereto a substantially parallel route at a selected distance therefrom.

By this way, it is possible also to two and laterally shift several receivers. The device may obviously be used in other fields than seismic prospecting.

Figure 2:
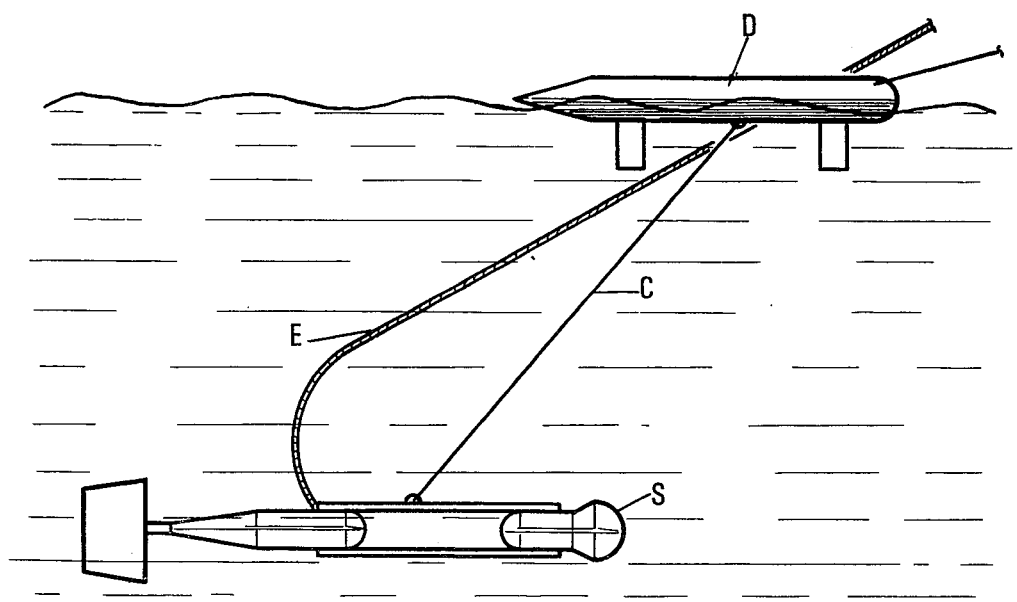
FIG. 2 shows a diagrammatical side view of a floating device connected to a submerged transmitting source.

FIG. 2 diagrammatically shows a side view of a floating device D, connected through a traction cable C to a transmitting source S placed in a carrier and electrically fed through a cable E.

Figure 3:
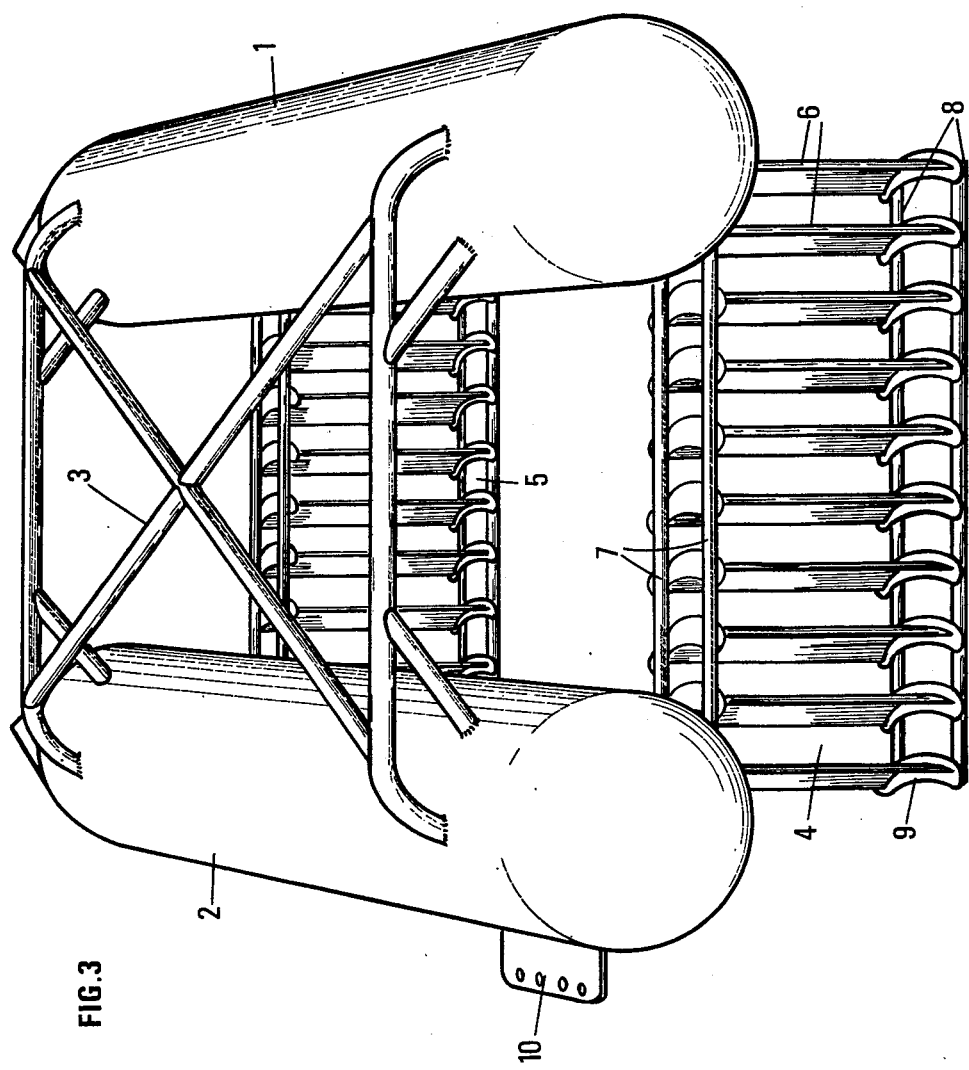
FIG. 3 diagrammatically shows a general view of a first embodiment of the floating device.

FIG. 3 illustrates in detail a preferred embodiment of the floating device. The latter essentially comprises two identical floats 1 and 2 of tubular shape having a semi-spherical portion at one end and a conical one at the other end. These floats are, for example, made of steel.

While U.S. Pat. No. 3,613,629 demonstrates that it has been known to utilize a deflector formed of a series of parallel paddles mounted at the forward end of a floating member so as to extend transversely with respect to the longitudinal axis of the device on floating devices for towing submerged members with a lateral shift with respect to the ship route, the arrangement of the aforementioned U.S. patent, like other prior art arrangements, merely utilizes a vertical stabilizer with horizontal stabilizers fastened thereto so as to serve as both a keel and rudder. However, the arrangement according to U.S. Pat. No. 3,613,629, fails to recognize that significant advantages can be achieved by the use of two parallel deflectors in the manner disclosed herein. Since stabilization effects depend not only on the magnitude of deflecting surface, but also upon its distribution in a stream of water. A deflector formed of a series of parallel paddles behaves differently from a rudder-like stabilizer fin because hydrodynamic pressure is exerted on the full cross section of the assembly. Thus, when a multiplicity of deflecting members transversely disposed under a support member is provided, i.e., when a stream of water with a certain cross section is channelized through a deflecting section, the influence of local disturbances of hydrostatic pressure occuring in a vertical plane is minimized. Accordingly, a deflecting assembly such as disclosed herein is very stable, and when two deflecting assemblies are used at points longitudinally distant from each other, a better stabilization of both the front and rear portions of the support member is achieved, and it has been verified that a floating member provided with two deflecting assemblies has a high route stability. As such, the development of a floating device which utilizes a second deflecting assembly formed of a plurality of parallel paddles, similar to that which have been used only at the forward end of floating devices heretofore, provides a device which has increased stability in contrast to those prior art devices which merely utilize single vertical, single horizontal, or combined horizontal and vertical rudder like stabilizing formations at the rear thereof.

They are interconnected through a rigid bracing assembly 3 so as to be parallel to one another. These floats are solid with two deflectors 4 and 5. Each deflector consists of a series of paddles 6, of curved profile, parallel to one another and secured by their ends to braces 7 and 8. These braces are themselves secured to the floats 1 and 2, preferably near each end, perpendicularly to the longitudinal axis of the device.

As shown in FIG. 3, each paddle 6 comprises at each end, a plate 9, corresponding in shape to the curvature of the paddle. They are destined to enhance the deviation action of the paddles. The paddles are so located as to form an angle with the longitudinal axis of the device. This angle is selected so as to obtain the desired shifting angle for the floating device, with respect to the ship route.

A connection member 10 secured to one of the floats 2, is provided for mooring the traction cable connecting the floating device to the ship. This connection member will be advantageously provided near the round portion forming the head of the float which is closer to the ship. Several connection members may also be used.

Figure 4:
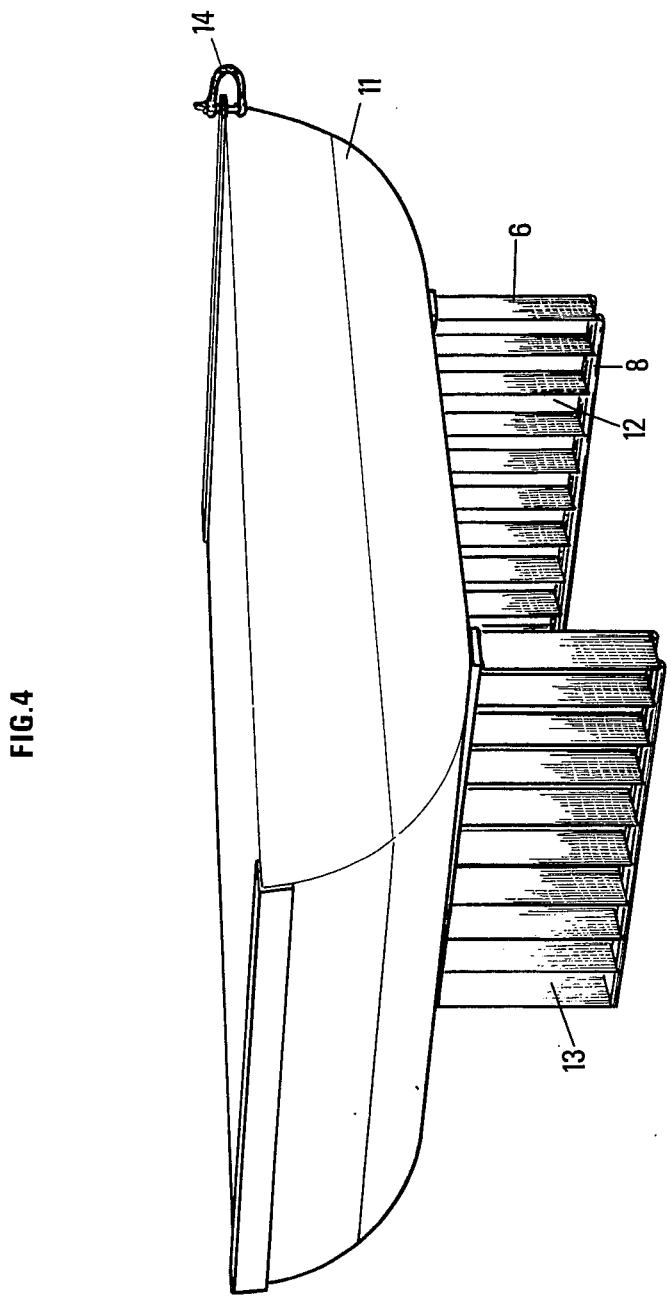
FIG. 4 diagrammatically shows a general view of a second embodiment of the floating device.

FIG. 4 illustrates a second embodiment of the floating device. In this embodiment, the floats 1 and 2, of tubular shape, and the braces 3 rigidly interconnecting them, are replaced by the float 11, in the form of a platform of a certain thickness. The lower portion of the platform, destined to be submerged and on which are secured two deflectors 12 and 13, has a round shape at its ends to facilitate the passage of water.

A connection member 14 (FIG. 4) is secured onto the platform.

Figure 5:
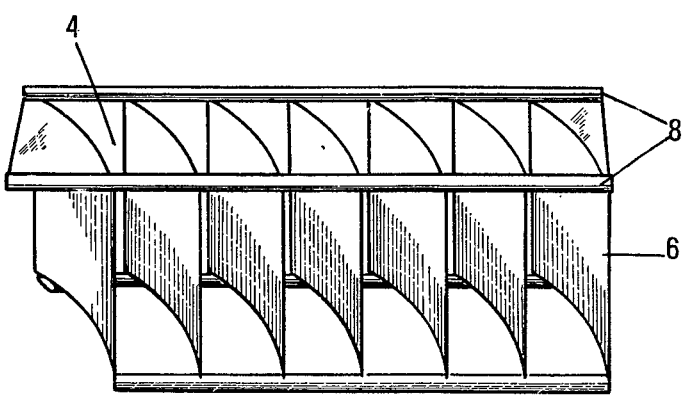
FIG. 5 diagrammatically is a detailed view of a deflector of the floating device with curved paddles.

Each deflector, illustrated in detail in FIG. 5, is formed, as well as in the preceding embodiment, of a series of paddles 6, parallel to one another, and forming a selected angle with the longitudinal axis of the device.

Figure 8:
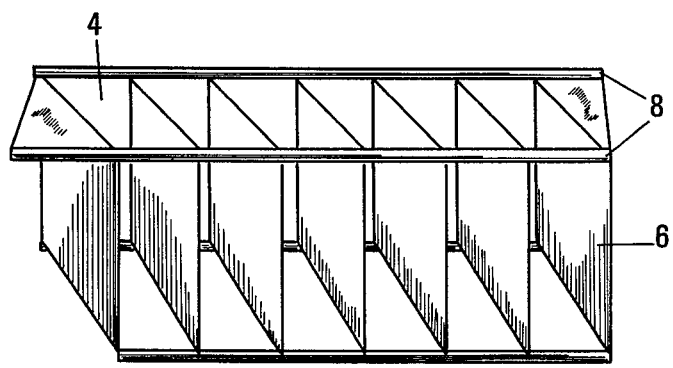
FIG. 8 diagrammatically is a detailed view of a deflector of the floating device with straight paddles.

According to the present embodiment, the paddles 6 are secured to the braces 8 directly and not through plates. The paddles shown have a curved profile, but paddles having a straight profile may also be used, see FIG. 8.

Figure 6:
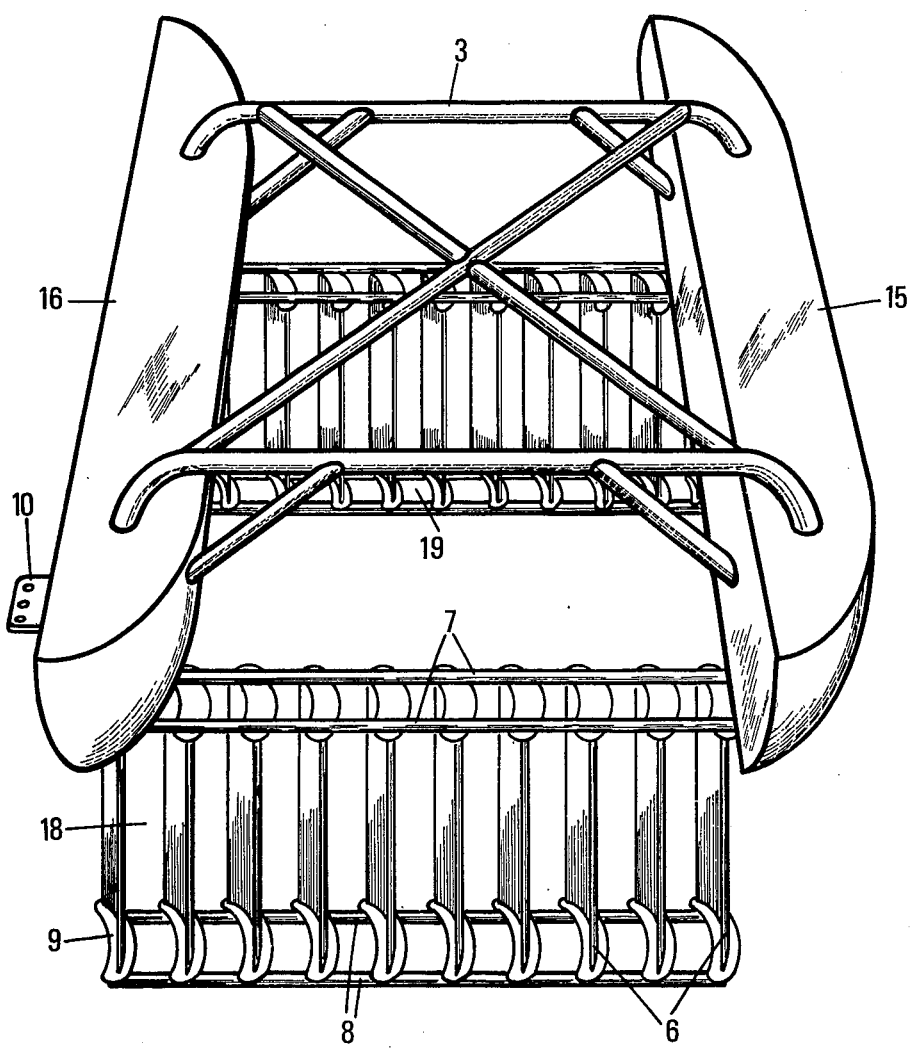
FIG. 6 diagrammatically shows a general view of a third embodiment of the floating device.

FIG. 6 illustrates a third embodiment of the device of the same type as that of FIG. 3. However, the two tubular elements are replaced with two identical floats 15 and 16, whose top view has the shape of a curved segment, the respective chords of which have a direction parallel to the longitudinal direction of the device, so that the curvatures of the segments be similarly oriented. Accordingly, the device is not symmetrical.

Deflectors 18 and 19, similar to those of the preceding embodiments, are placed in such a manner that the braces 7 and 8, to which are secured the paddles, be perpendicular to the longitudinal direction of the ship, the curvature of paddles 6 being in the same direction as that of segments 15 and 16.

This special arrangement of the floats has the effect of increasing the divergent action on the device.

Figure 7:
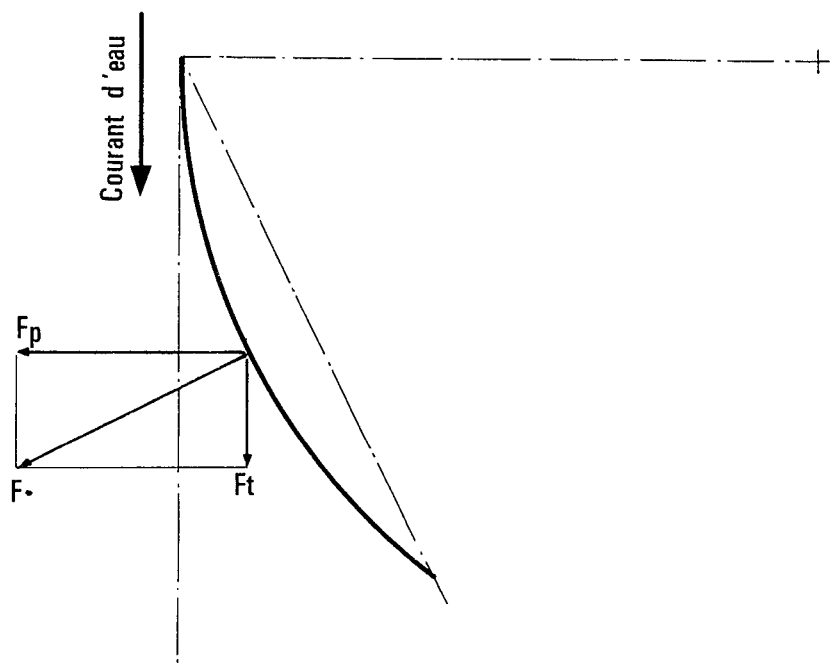
FIG. 7 is a diagram of the forces exerted on a paddle of a deflector.

In operation, the floating device according to one of the preceding embodiments is towed from the ship N, its deflectors being submerged. The water stream which is produced exerts a force F on the paddles as diagrammatically shown in FIG. 7.

This force F has a transversal component Fp which tends to shift the floating device away from the ship, and a component Ft, parallel to the water stream direction, which has a detrimental effect since it tends to brake the device and bring it closer to the ship. It is thus convenient to reduce as much as possible this force Ft, and this can be done by selecting a convenient shape of the paddles.

What is claimed is:

1. In a device for shifting a submerged member towed from a ship with respect to the moving direction of said ship, which comprises floating means, and submerged deflector means fixed to said floating means, said deflector means including a plurality of parallel paddles curved in the same direction, each having a generatrix perpendicular to the plane of flotation, the improvement comprising said paddles being arranged in two assemblies respectively placed at the head and at the rear of said floating means, and said floating means comprising two elongated floating members, each having a longitudinal cross-section with a curved segment at one side thereof, the respective chords of said segments extending along a direction parallel to the longitudinal axis of said floating means, and the curvatures of said curved segments being oriented in the same direction as the curvature of said paddles.

2. A device according to claim 1, wherein said two floating members are disposed with said curved segments asymmetrical with respect to said longitudinal axis.

3. A device according to claim 1, wherein said two assemblies of paddles are each disposed perpendicularly to said longitudinal axis.

4. A device according to claim 1, wherein said plurality of parallel paddles in each of said two assemblies are disposed at an angle to the longitudinal direction of said device.

5. A device according to claim 1, wherein each of said paddles in said two assemblies has a curved profile.

6. A device according to claim 1, wherein each of said paddles in said two assemblies has a straight profile.

* * * * *